(12) United States Patent
Cangini et al.

(10) Patent No.: US 8,185,955 B2
(45) Date of Patent: May 22, 2012

(54) INTRUSION DETECTION METHOD AND SYSTEM, RELATED NETWORK AND COMPUTER PROGRAM PRODUCT THEREFOR

(75) Inventors: Gianluca Cangini, Turin (IT); Francesco Coda Zabetta, Turin (IT); Gerardo Lamastra, Turin (IT)

(73) Assignee: Telecom Italia S.p.A., Milan (IT)

( * ) Notice: Subject to any disclaimer, the term of this patent is extended or adjusted under 35 U.S.C. 154(b) by 966 days.

(21) Appl. No.: 11/791,609

(22) PCT Filed: Nov. 26, 2004

(86) PCT No.: PCT/EP2004/013424
§ 371 (c)(1),
(2), (4) Date: May 29, 2007

(87) PCT Pub. No.: WO2006/056223
PCT Pub. Date: Jun. 1, 2006

(65) Prior Publication Data
US 2007/0300301 A1 Dec. 27, 2007

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06E 1/00* | (2006.01) |
| *G06E 3/00* | (2006.01) |
| *G06F 15/18* | (2006.01) |
| *G06F 17/00* | (2006.01) |
| *G06G 7/00* | (2006.01) |
| *G06N 3/08* | (2006.01) |
| *G06N 7/00* | (2006.01) |
| *G06N 7/08* | (2006.01) |

(52) U.S. Cl. ............... 726/23; 706/16; 706/25; 706/59
(58) Field of Classification Search ............ 726/22–25; 706/15–61
See application file for complete search history.

(56) References Cited

U.S. PATENT DOCUMENTS

| | | | |
|---|---|---|---|
| 5,278,901 A | 1/1994 | Shieh et al. | |
| 5,926,652 A * | 7/1999 | Reznak | ............ 712/300 |
| 6,487,666 B1 | 11/2002 | Shanklin et al. | |

(Continued)

FOREIGN PATENT DOCUMENTS

EP 0 985 995 B1 3/2000

(Continued)

OTHER PUBLICATIONS

Wagner, D. et al., "Intrusion Detection Via Static Analysis," IEEE Symposium on Security and Privacy, pp. 156-169, (2001).

(Continued)

*Primary Examiner* — Christian Laforgia
(74) *Attorney, Agent, or Firm* — Finnegan, Henderson, Farabow, Garrett & Dunner, L.L.P.

(57) ABSTRACT

Intrusions in a system under surveillance are detected by matching the events occurring during operation of the system against a knowledge base including information on events which occurred during a learning phase. The detection technique includes the steps of: recording, during the learning phase, temporal data related to the events during the learning phase; identifying, as a function of the temporal data recorded, a dynamic part of the knowledge base; discovering patterns that cover the dynamic part of the knowledge base; and using, during the analysis phase, a regular expression match at least with respect to the dynamic part of the knowledge base.

26 Claims, 6 Drawing Sheets

U.S. PATENT DOCUMENTS

| | | | |
|---|---|---|---|
| 6,671,811 B1 * | 12/2003 | Diep et al. | 726/23 |
| 6,742,124 B1 | 5/2004 | Kilpatrick et al. | |
| 6,769,066 B1 * | 7/2004 | Botros et al. | 726/23 |
| 6,792,546 B1 | 9/2004 | Shanklin et al. | |
| 7,032,114 B1 * | 4/2006 | Moran | 713/187 |
| 7,065,657 B1 * | 6/2006 | Moran | 726/5 |
| 7,085,936 B1 * | 8/2006 | Moran | 726/5 |
| 7,181,768 B1 * | 2/2007 | Ghosh et al. | 726/23 |
| 7,406,714 B1 * | 7/2008 | Nachenberg | 726/23 |
| 7,424,619 B1 * | 9/2008 | Fan et al. | 713/188 |
| 7,464,158 B2 * | 12/2008 | Albornoz | 709/224 |
| 7,519,860 B2 * | 4/2009 | Hatonen et al. | 714/26 |
| 7,568,229 B1 * | 7/2009 | Nachenberg et al. | 726/23 |
| 7,809,670 B2 * | 10/2010 | Lee et al. | 706/59 |
| 2002/0082886 A1 | 6/2002 | Manganaris et al. | |
| 2002/0138755 A1 | 9/2002 | Ko | |
| 2005/0108562 A1 * | 5/2005 | Khazan et al. | 713/200 |
| 2006/0037077 A1 * | 2/2006 | Gadde et al. | 726/23 |
| 2007/0239752 A1 * | 10/2007 | Beitman | 707/101 |
| 2007/0260589 A1 * | 11/2007 | Yugami | 707/3 |

FOREIGN PATENT DOCUMENTS

| | | |
|---|---|---|
| WO | WO 2005/059720 A1 | 6/2005 |

OTHER PUBLICATIONS

Zanero, S. et al., "Unsupervised Learning Techniques for an Intrusion Detection System," Proceedings of the ACM Symposium on Applied Computing, ACM SAC 2004, containing 8 pages, (March 14-17, 2004).

Brāzma, A. et al., "Finding a Good Collection of Patterns Covering a Set of Sequences," University of Helsinki, Department of Computer Science, Series of Publications C, No. C-1995-60, pp. i-ii and pp. 1-22, (Dec. 1995).

Forrest, S. et al., "A Sense of Self for Unix Processes," IEEE Symposium on Security and Privacy, pp. 120-128, (1996).

Angluin, D., "Finding Patterns Common to a Set of Strings," Journal of Computer and System Sciences 21, pp. 46-62, (1980).

* cited by examiner

INTRUSION DETECTION METHOD AND SYSTEM, RELATED NETWORK AND COMPUTER PROGRAM PRODUCT THEREFOR

CROSS REFERENCE TO RELATED APPLICATION

This application is a national phase application based on PCT/EP2004/013424, filed Nov. 26, 2004, the content of which is incorporated herein by reference.

FIELD OF THE INVENTION

The present invention relates to Intrusion Detection Systems (IDSs). The purpose of these systems is to detect security problems in computer systems and networks caused by the action of an external or internal agent that may damage the computer system or the network. The agent can be an automatic system (i.e. a computer virus or a worm) or a human intruder who tries to exploit some weaknesses in the system for a specific purpose (i.e. unauthorized access to reserved data).

DESCRIPTION OF THE RELATED ART

The purpose of a computer Intrusion Detection System (IDS) is to collect and analyze the information on the activity performed on a given computer system in order to detect, as early as possible, evidence of a malicious behaviour.

Two fundamental mechanisms/arrangements have been developed so far in the context of Intrusion Detection: Network-Based Intrusion Detection Systems (NIDS) and Host-Based Intrusion Detection Systems (HIDS).

Network-Based Intrusion Detection Systems analyze packets that flow in the system/network under surveillance, searching for anomalous activities; the majority of Network-Based Intrusion Detection Systems employs pattern-based techniques to discover evidence of an attack.

Host-Based Intrusion Detection Systems work on a host-per-host basis, using a broader variety of techniques, to achieve their purpose. Host-Based Intrusion Detection Systems are usually better tailored for detecting attacks that can have a real impact on the host under their control.

Network-Based Intrusion Detection Systems have a broader vision of the computer network in comparison with their Host-Based counterparts. As a consequence of this, Network-Based Intrusion Detection Systems can correlate different attacks more easily and can detect anomalies that can be neglected if only a single host is taken into account. Specific attacks, such as those that employ ciphered connections or some form of covert channels, are however extremely difficult to discover using Network Based techniques only.

In conclusion, both mechanisms should notionally be used when deploying a complete Intrusion Detection System.

In order to measure the effectiveness of an Intrusion Detection System, it is possible to evaluate two fundamental figures: the rate of False-Positives and the rate of False-Negatives. False-Positives are those normal events that are erroneously detected as attacks; conversely, False-Negatives are effective attacks that are not correctly identified by the Intrusion Detection Systems.

A primary goal of an Intrusion Detection Systems is thus to minimize these figures, while maintaining an acceptable analysis rate (that is, the number of events that can be analyzed in a time unit). Obviously, different technologies result in different False-Positives and False-Negatives rates.

The most commonly used techniques for Intrusion Detection Systems are Misuse Detection (MD) and Anomaly Detection (AD). Occasionally, Artificial Intelligence (AI) and State Analysis (SA) techniques have been used, but only in few implementations.

Misuse Detection is the technique commonly adopted in Network-Based Intrusion Detection Systems. Usually, some pattern matching method is applied over a series of rules to detect misuse conditions. Exemplary of this approach are the arrangements disclosed e.g. in U.S. Pat. No. 5,278,901 or U.S. Pat. No. 6,487,666.

Pattern-Based systems are well suited for Network-Based Intrusion Detection Systems but are not very efficient in the context of Host-Based Intrusion Detection Systems, where they can generate high False-Negatives rate, because this mechanism usually fails to detect something if a specific signature has not been provided.

The so-called Anomaly Detection Paradigm is another approach adopted in Intrusion Detection Systems. Anomaly Detection systems "learn" the normal behaviour of the host or the network they should protect, by collecting all events occurring during a training phase. These data are organized into a structured knowledge base, which is then used in order to detect events that significantly diverge from whatever has been observed previously. Those events are strongly suspicious, and are signaled as indications of a likely incoming intrusion. For a detailed discussion of the application of Anomaly Detection techniques in the field of Intrusion Detection, see D. Wagner and D. Dean "Intrusion Detection via Static Analysis", IEEE Symposium on Security and Privacy, 2001, pp. 156-169. Anomaly Detection may be used in both Network-based and Host-based Intrusion Detection Systems, although it is fairly more common in this latter case.

Anomaly Detection is able to cope with unseen attack patterns, reducing the False-Negative rate. However, it also shows a sensibly higher False-Positive rate, because certain permitted actions have not been included in the policy or have not been observed during the learning stage.

To a certain extent, a kind of duality exists between Misuse Detection and Anomaly Detection: a Misuse Detection system uses a set of signatures to detect attacks; so, it can only detect known attacks; on the opposite side, Anomaly Detection system can detect unknown events, however it is difficult to distinguish between real attacks and unforeseen regular behaviour. Hence, each one has its own advantages and disadvantages.

One of the most important advantages of an Anomaly Detection system lies in that such a system does not need periodical updates to keep effectiveness, as a Misuse Detection system does; after the initial training phase, it is immediately able to detect also new attacks, for which there are still no signatures available.

The effectiveness of such an approach strongly relies and depends on the quality of the knowledge base built during the learning phase and on the performances of the detection method: a system which is not well trained may generate a huge amount of False-Positives, detecting events that diverge from the knowledge base but are not related to a real incoming intrusion. In many cases, the amount of such useless data makes the whole system unmanageable.

The effectiveness of an Anomaly Detection system thus largely depends on the construction of the knowledge base, and several techniques have been proposed for optimizing the learning process. This process must to be substantially automatic, otherwise using the system effectively it would be extremely difficult.

A basic example of the automatic construction of a knowledge base is presented in Zanero and S. M. Savaresi: "Unsupervised Learning Techniques for an Intrusion Detection System", Proceedings of the ACM Symposium on Applied Computing, ACM SAC 2004, 14-17 Mar. 2004.

In this paper, the authors describe a system that collects all packets in the network under surveillance, and builds the knowledge base by classifying applicative packet payloads to create a distribution of the typical network traffic. The system then uses this application level classifier to detect significant deviation from the usual traffic patterns. The most critical issue in such a system is the need of discriminating between temporary network spikes, related to an increase of regular activity, from the occurrence of a real attack. In general, certain mathematical models are used to make such a distinction; however, such models depend on some intrinsic parameters (thresholds) which are usually hard to estimate correctly.

In general, and independently of the specific context, an Anomaly Detection system struggles with the need of keeping the training phase reasonably short and the knowledge base small, while at the same time it should be able to identify all the events that are perfectly admissible in the system under analysis.

A quite critical situation arises when these systems have to cope with a highly dynamic environment, where many different resources are used temporarily, oftentimes never to be used again under identical circumstances. For that reason, Anomaly Detection systems are usually best suited for static and slowly varying environments.

Document U.S. Pat. No. 6,742,124 discloses an Anomaly Detection System based on analysis of sequences of system calls, intercepted by a software wrapper. That system operates in real time through the representation of known sequences of system calls in a distance matrix. The distance matrix indirectly specifies known sequences of system calls by specifying allowable separation distances between pairs of system calls. The distance matrix is used to determine whether a sequence of system calls in an event window represents an anomaly.

Document EP-A-0 985 995 describes another advanced application of this technique, which relies on the TEIRESIAS method. This method allow to identify long patterns in system call sequences and, hence, allow to better define the correlation function that is used in the Anomaly Detection method, when a generic execution of the monitored process is compared with a static set of system call sequences generated during the learning stage.

Both the prior art documents considered in the foregoing disclose arrangements that perform detection by analyzing sequences of system calls issued during the normal process activity; this is indeed one of the most interesting applications of the Anomaly Detection technique in the context of Host-based Intrusion Detection System. Generally speaking, a modern Operating System uses at least two different levels of privilege for running applications; at user level, the application behaviour is constrained and the single application cannot manipulate arbitrarily system wide resources, while at the kernel level, the application has a complete control over the system. The transition between user and kernel level is regulated by the system calls, which allow a non-trusted application to manipulate a system-wide resource. For example, using a system call an application can spawn (or terminate) another application, create a file, or establish a network connection.

Several documents discuss Pattern Discovery techniques. Such Pattern Discovery techniques are well known especially in the field of Bio-Informatics; in fact, these methods are widely used in that context to extract protein and DNA/RNA (Deoxyribonucleic Acid/Ribonucleic Acid) patterns from long sequences of genetic material. In general, Pattern Discovery Techniques are used to extract some significant information that repeats itself over long sequences of apparently random data. A major part of this information is not relevant for the process.

The paper from the University of Helsinki entitled "Finding a Good Collection of Patterns Covering a Set of Sequences" by A. Brazma, E. Ukkonen, J. Vilo [http://www.cs.helsinki.fi/TR/C-1995/60/] can be considered a basic reference for what concerns Pattern Discovery methods. It shows with several example how it is possible to extract patterns from a set of sequences and which of the possible covering should be considered the best one.

Document PCT/EP03/14385 discloses Host-based Intrusion Detection System based on Anomaly Detection that performs three steps: a learning phase (when the knowledge base is built by analyzing a predefined set of system calls), a normalization phase (the knowledge base is off-line optimized by pruning useless data or translating it into a more compact form so to improve effectiveness of whole system) and an analysis phase (when the anomaly detection is really performed). Such an arrangement relies i.a. on the concept that it is possible to monitor effectively the behaviour of a given application. This concept is broadly accepted in the Intrusion Detection scientific community, as witnessed by e.g. S. Forrest and al. in "A Sense of Self for Unix Processes", IEEE Symposium on Security and Privacy, 1996, pp. 120-128. This article discusses a method for anomaly detection based on the short-range correlation of sequences of system calls.

Another example of Anomaly Detection Based IDS is described in document US2002/0138755-A1

OBJECT AND SUMMARY OF THE INVENTION

Despite the extensive efforts witnessed by the prior art discussed in the foregoing, the need is felt for a truly efficient technique that may minimize the False-Positive rate by further improving the way of building and refining the knowledge base in an Intrusion Detection System based on the Anomaly Detection paradigm. This without unduly increasing the size of the knowledge base and the amount of time involved in the training phase.

The object of the invention is thus to provide a fully satisfactory response to this need.

According to the present invention, that object is achieved by means of a method having the features set forth in the claims that follow. The invention also relates to a corresponding Intrusion Detection System, a network including at least one system exposed to intrusions and under surveillance by such an associated Intrusion Detection System as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

A preferred embodiment of the invention is an Intrusion Detection System based on Anomaly Detection Paradigm, wherein intrusions in a system under surveillance are detected by analyzing events occurring during operation of said system under surveillance by matching said events occurring during operation of said system against a knowledge base including information on events occurred during a learning phase, operation of such a system including the steps of:

recording, during said learning phase, temporal data related to said events occurred during said learning phase;

identifying a dynamic part of said knowledge base as a function of said temporal data;

discovering patterns that cover said dynamic part of the knowledge base; and using, during said analysis phase, a regular expression match at least in respect of said dynamic part of the knowledge base.

The exemplary arrangement described herein aims at improving the effectiveness of Intrusion Detection System based on Anomaly Detection by applying Pattern Discovery techniques on those data that represents the dynamic section of the monitored system.

In the solution described herein a Pattern Discovery method is used to transform the data in a more compact and significant form; all the data analyzed are regarded as significant for deriving the pattern, while in classical bio-informatics application, there are few interesting sub-sequences in a sea of uninteresting data. Moreover, the pattern discovery mechanism described herein is more concerned with the identification of similarities existing between the strings that represent resource properties that the Intrusion Detection System has to monitor. The main goal of the solution described herein is thus finding a minimal coverage (in terms of patterns) of the set of strings that are analyzed; this allows the Intrusion Detection System to manage also resources that have never been used during the learning stage, which however are perfectly legitimate to use.

The solution described herein aims at minimizing the False-Positive rate, without increasing the size of the knowledge base and the amount of time required for creating such a knowledge base, by recording some extra information, related to the temporal behavior of the events recorded during the learning stage. This data is then processed using a specific pattern extraction technique, which generates a more compact knowledge base and also identifies extremely volatile and dynamic resource usage patterns, which cannot be analyzed using the classical Anomaly Detection approach.

Roughly speaking, the basic concept underlying the solution described herein is to detect and isolate areas of highly dynamic activity, which would be unmanageable using standard Anomaly Detection techniques, as they would generate too many False-Positives.

In order to better understand this concept, one simply needs to consider that a conventional Intrusion Detection System performing Anomaly Detection on the traffic directed to an Internet accessible web server may collect all the IP addresses of clients seen during the training phase. Quite obviously, such a system will not be able to observe all the possible IP addresses that will be connecting during the rest of the web server activity (unless an infinite time of learning is assumed). Hence, at the end of the training phase, the system would still produce an alert for each unobserved client connecting to the server.

A direct solution to this problem lies in the use of policies: the Intrusion Detection System will thus be instructed to the effect that certain resources of the system under surveillance must not be monitored; the limit of this approach is the necessity of writing and managing this information for a large set of different computer systems. The language used to specify the policy should be rich enough to permit a fine grained tuning; however, this opens the door to human misconfiguration errors, and it also requires to waste time and skill of a human system administrator.

The solution described herein provides a method for detecting automatically areas of high dynamic activity, where classical Anomaly Detection is avoided. This is obtained through additional time data collected during the learning phase; this data is then processed using statistical analysis and a specific Pattern Discovery technique, which convert the list of dynamic resources in a more compact set of patterns. Patterns are a way to simplify the knowledge base; they also provide a simple mechanism that allows an Anomaly Detection system to match a potentially infinite number of events using only a single element of the knowledge base.

In that respect, one may consider again the example where an Anomaly Detection Intrusion Detection System monitors an Internet accessible web server; by using the solution described herein, the Intrusion Detection System is capable, without any human intervention, to recognize that client connections should be considered dynamic (as the server receives a lot of connections, each with a different address, and each connection has a limited duration). Hence, the Intrusion Detection System will not trigger any alarm when it sees a connection to the web server that does not come from one of the previously observed addresses. At the same time, a Pattern Discovery technique can detect if all the connections are related; for example, if only clients from a specific subnet can access the web server, the network address and the network mask becomes the patterns which the Intrusion Detection System can use for matching a new connection.

IP addresses, file names and any other resource attribute that may be significant for the detection process can be described in terms of character strings with some specific formats (for example, IP address have all the format xxx.xxx.xxx.xxx, while filenames on Unix systems have all the format /path1/path2/path3/ . . . /file). By using pattern structure and a specific pattern identification technique, it is possible to substitute the set of IP address, filenames and any other resource attribute that has been observed during the learning with a single pattern.

BRIEF DESCRIPTION OF THE ANNEXED DRAWINGS

The invention will now be described, by way of example only, with reference to the enclosed figures of drawing, wherein.

DETAILED DESCRIPTION OF PREFERRED EMBODIMENTS OF THE INVENTION

The basic platform of the exemplary arrangement described herein is an Anomaly Based Intrusion Detection System. This can be of any known type as discussed in the introductory portion of this description, thus making it unnecessary to provide further detail herein.

During a first stage called learning phase, such an Anomaly Based IDS records a certain amount of data about the system monitored (e.g. a host computer) such as the processes running on the system, the credentials under which they run, the system resources they use. In doing so, the IDS creates a knowledge base that identifies the usual behavior of the system.

During a subsequent stage called the analysis phase, the data in the knowledge base is matched against the real-time state of the system and any difference between them (i.e. the system performs an action not present in the knowledge base, such as launching a new process, opening a new file, etc.) is considered an anomaly, hence an alert is issued.

As already explained in the introducing portion of the description, a basic issue arising in such an arrangement is that during normal behavior the system under surveillance (hereinafter a host computer will be primarily referred to for the sake of simplicity) always performs some actions not recorded during the learning phase. This can be for example the case of an application opening client sockets, or a server writing temporary session files, or a legitimate user uploading a new file in its own directory. All these actions are generally considered as anomalies and alerts will be issued resulting to be False-Positive alarms.

Figure 1:
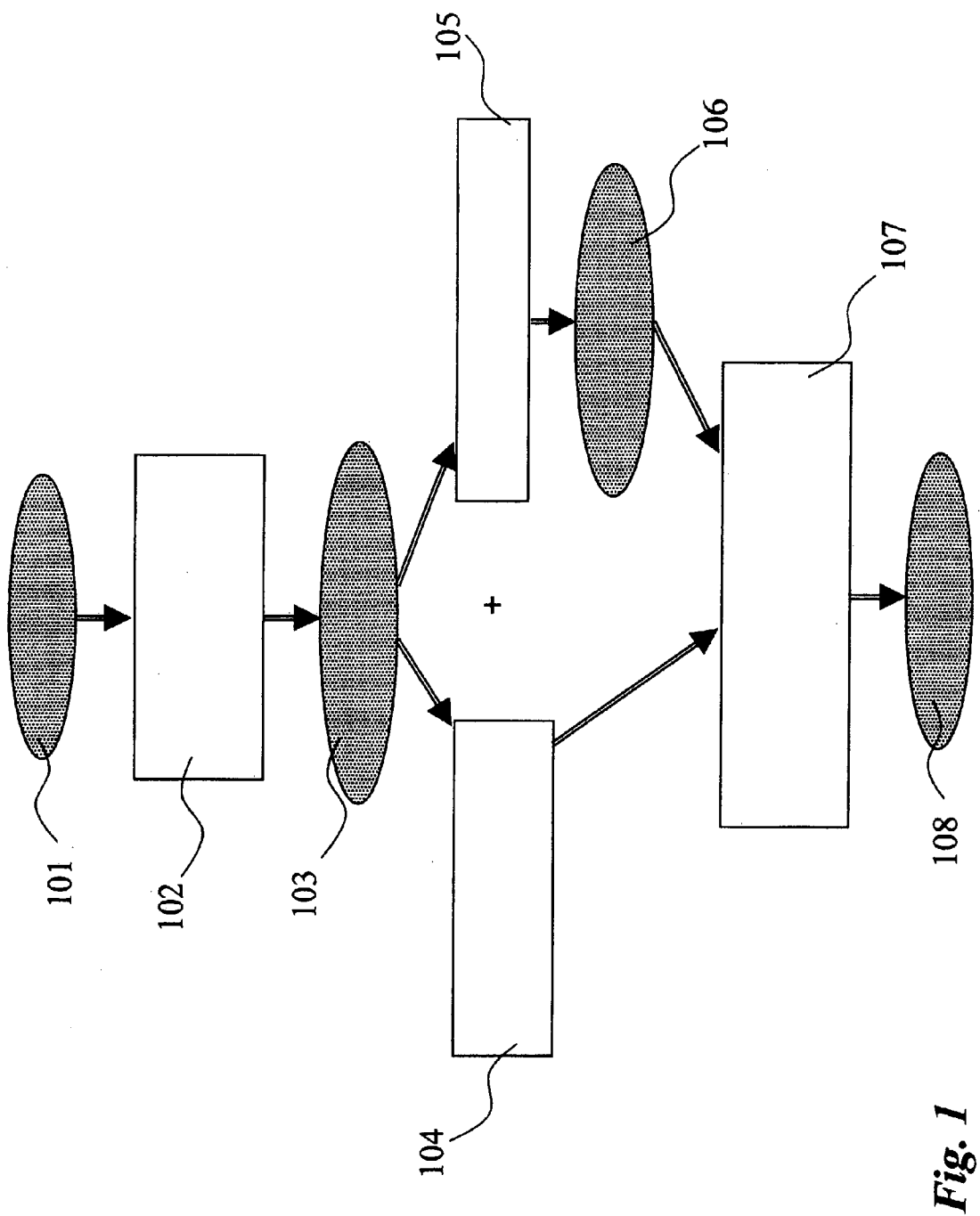
FIG. 1 shows is a block diagram of operating phases in the exemplary arrangement described herein.

The solution described herein tackles such an issue by automatically "tuning" the knowledge base after the learning phase and changing it into a more compact and semantically enriched form for the subsequent analysis phase as shown in FIG. 1.

This optimization of the knowledge base, and involves the following steps:
  record additional temporal data during the learning phase;
  identify the dynamic part of the knowledge base;
  discover patterns that cover the dynamic part of the knowledge base;
  use a regular expression match during the analysis phase (instead of an exact match).

In particular, with reference to FIG. 1, it is possible to identify different steps.

Step (a)—During the learning phase of an Anomaly Detection system, designated 101 in FIG. 1, several information of the monitored host are recorded. These are for example: the processes running on the system, the credentials under which they run and the system resources they use. In the arrangement described herein, additional temporal information is recorded, such as when a process starts and ends, when it requests and releases a certain resource, how many times the resource is used during the learning period, and so on. So, in general, for every kind of monitored resource of the system (files, sockets, devices, registry, processes, users . . . ) the method records exactly when each resource is used, meaning that the method tracks with a timestamp each instant when a resource is requested or released. From these data, other temporal parameters can be calculated, such as the total number of use and the total amount time, as explained hereafter for the case of files.

In a first possible embodiment of the arrangement described herein the file-system of a host computer/system is monitored.

In a step 102 the Anomaly Detection system records what files are opened and closed by which processes (resource list), and hence stores in the knowledge base the filename along with other attributes (temporal information) that can be considered useful (i.e. file size, file owner, file permissions, etc.).

In a presently preferred arrangement for each file these additional temporal information items are recorded:
  a timestamp (TS) indicating when the file was opened for the first time;
  a timestamp (TE) indicating when the file was closed for the last time;
  an integer (N) indicating how many times the file was opened/closed between these two instants;
  an integer ($\Delta$) indicating the number of milliseconds during which the file was in open state.

Additionally, there are two global timestamps (TLS and TLE) indicating the beginning and the end of the learning phase.

Figure 2:
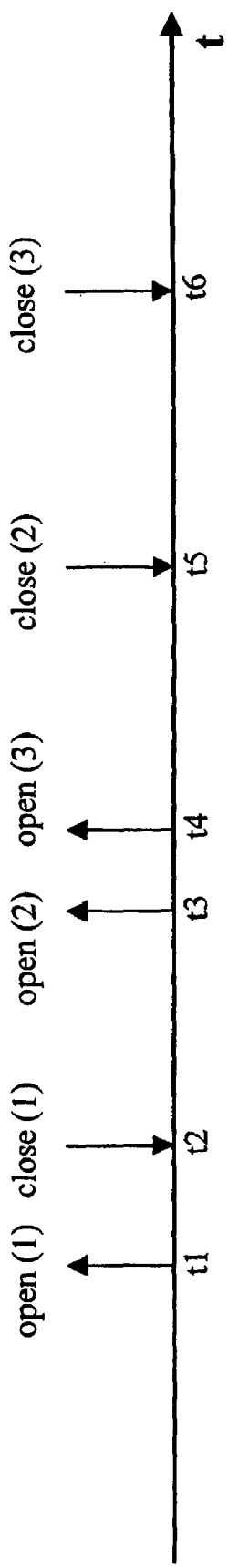
FIG. 2 shows an example of a method of recording additional information for a resource within the framework of the exemplary arrangement described herein.

FIG. 2 shows a graphical example of how all these values can be recorded for a resource named R.

This kind of temporal data are exactly the same for sockets: in fact they are opened and closed as the files. For process monitoring TS, the timestamp when the first instance of a process starts, and TE, the timestamp when the last instance exits, are recorded and so on for every other kind of system resource.

Step (b)—With the additional data recorded in Step (a) it is possible to predict part of the future behavior of the system. In order to do so, in a step 103, the whole knowledge base is divided in two parts, designated a stable part and a dynamic part, respectively.

The stable part, which is the resource list indicated 104 in FIG. 1, is the one with the resources whose temporal data indicate they were intensively used during the learning period. The dynamic part, which is the resource list indicated 105 in FIG. 1, on the other hand, is represented by the set of resources that were used seldom during the same period. Of course the distinction between intense and rare use of a resource can be made with several possible comparison expressions. By using certain parameters as thresholds, it is possible to tune the expressions in order to best fit the situation of the monitored system. For instance, by defining T1 a percentage threshold that indicates what is considered to be rare in comparison to the whole period of learning (i.e. 0.1%), and T2 an integer threshold that indicates a minimum number of use of a resource (i.e. 5), some possible expressions to define a temporary (i.e. dynamic) resource "i" can be:

$$(TE_i - TS_i) < (TLE - TLS) * T1$$

$$(\Delta_i < (TLE - TLS) * T1) \text{ AND } (N_i < T2)$$

Depending on the monitored resource considered, and the kind of system the Host-Based Intrusion Detection Systems runs on, other possible comparison expressions can be used.

Those of skill in the art will promptly appreciate that those given in the art are just examples of a notionally boundless number of ways of achieving the same basic result of partitioning the whole knowledge base in a stable part and a dynamic part.

In the exemplary embodiment described herein, by referring to filesystem monitoring, a division is obtained between regular files, such as configuration files, libraries, executables, documents, etc. and temporary files such as cookies, session files, process info, etc. This division however is not made with static rules or policy, by looking at file type or at their location in the system, but only with the extra temporal data recorded for each file. Several possible filters can be used, depending on the level of accuracy and customization desired. For filesystem monitoring, using the first expression above may suffice. This means that a file is considered to be temporary if it is used for a very short period over the whole learning phase, even if during that period it is used several times.

Figure 3:
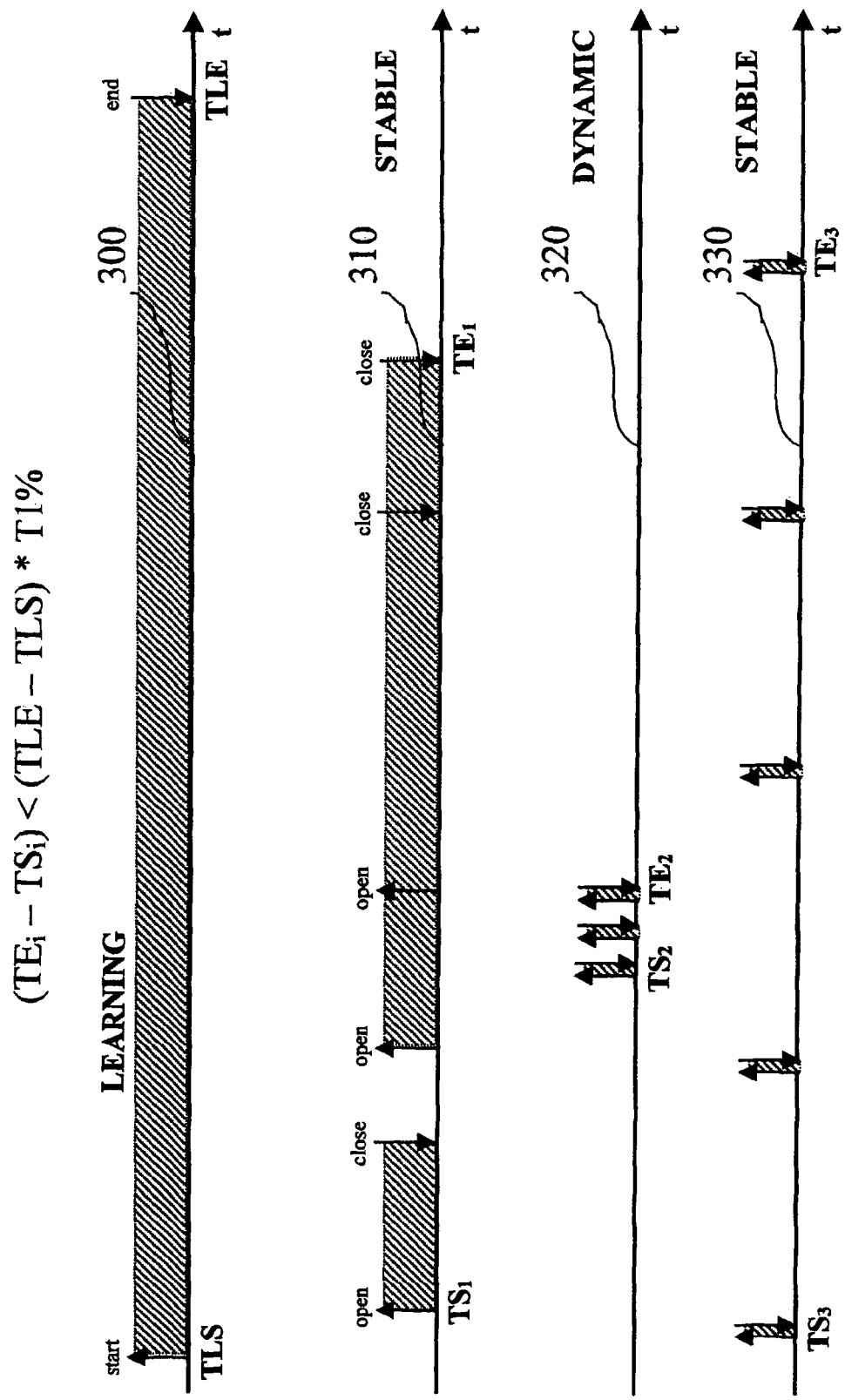
FIG. 3 shows an example of distinction between stable and dynamic resources.

FIG. 3 shows an example of distinction between stable and dynamic resources. Reference number 300 designates the learning phase as a whole, and reference numbers 310 and 330 designate two stable resources, while reference number 320 designates a dynamic resource.

If applied to sockets, this step automatically creates a distinction between server sockets (always listening for connections) and client sockets (opened only for short times and usually each time on different ports).

Step (c)—When the set of dynamic data, 105 in FIG. 1, is defined, the aim of a step 106 is to try to extract from it a set of patterns in order to reduce the knowledge base size and to identify areas that can be considered dynamic instead of a simple data list. For resources recorded as strings (filenames, pathnames, device names, etc.) this will result in finding one or more regular patterns that cover the whole dynamic set.

By "regular pattern" those patterns are meant having only one variable symbol that can appear only once: if the strings are composed by characters from the alphabet $\Sigma$, regular patterns are nonempty strings from the same alphabet $\Sigma$, that must also contain one special character* $\notin \Sigma$, called jolly. A pattern is considered to cover a set of strings if all strings in the set can be obtained from the pattern by substituting the jolly with an appropriate sequence of characters, i.e. the strings "home", "house", "horse" are covered by the pattern "ho*e"

More detailed information about this way of handling patterns can be derived by documents such as: D. Angluin "Finding patterns common to a set of strings", Journal of Computer and System Sciences 21, pp. 46-62 (1980), and A. Brazma, E. Ukkonen, J. Vito "Finding a good collection of patterns covering a set of sequences", Report C-1995-60, Department of Computer Science, University of Helsinki, December 1995.

To obtain significant patterns, some semantic issues are taken into account. By "significant patterns" those patterns are meant that should identify the dynamic areas of the knowledge base, without covering the stable part. For that purpose, a Pattern Discovery process is applied to the correct set of data (i.e. by dividing the whole set of dynamic data into sub-sets) and with correctly tuned thresholds. The way to divide the set of dynamic data depends on the semantic of data themselves and on how they are recorded in the knowledge base: for files, this will occur based on the filesystem structure (with pathnames like "/<dir>/<sub-dir>/ . . . /<filename>" for UNIX-like systems or "<disk>:\<dir>\<sub-dir>\ . . . \<filename>" for Microsoft systems), for socket connections this will occur based on a structure like "<protocol>:<port>:<local address>:<remote address>", for users, the basic factor can be the string "<domain>\<username>" and so on for each resource of the system. This means that whatever the resources to monitor, they will be recorded with a certain semantics in the knowledge base, and the same semantic must be followed to divide the dynamic set in the optimization process (files divided into directories, socket divided into protocol:port groups, users divided in domains, and so on).

Figure 4:
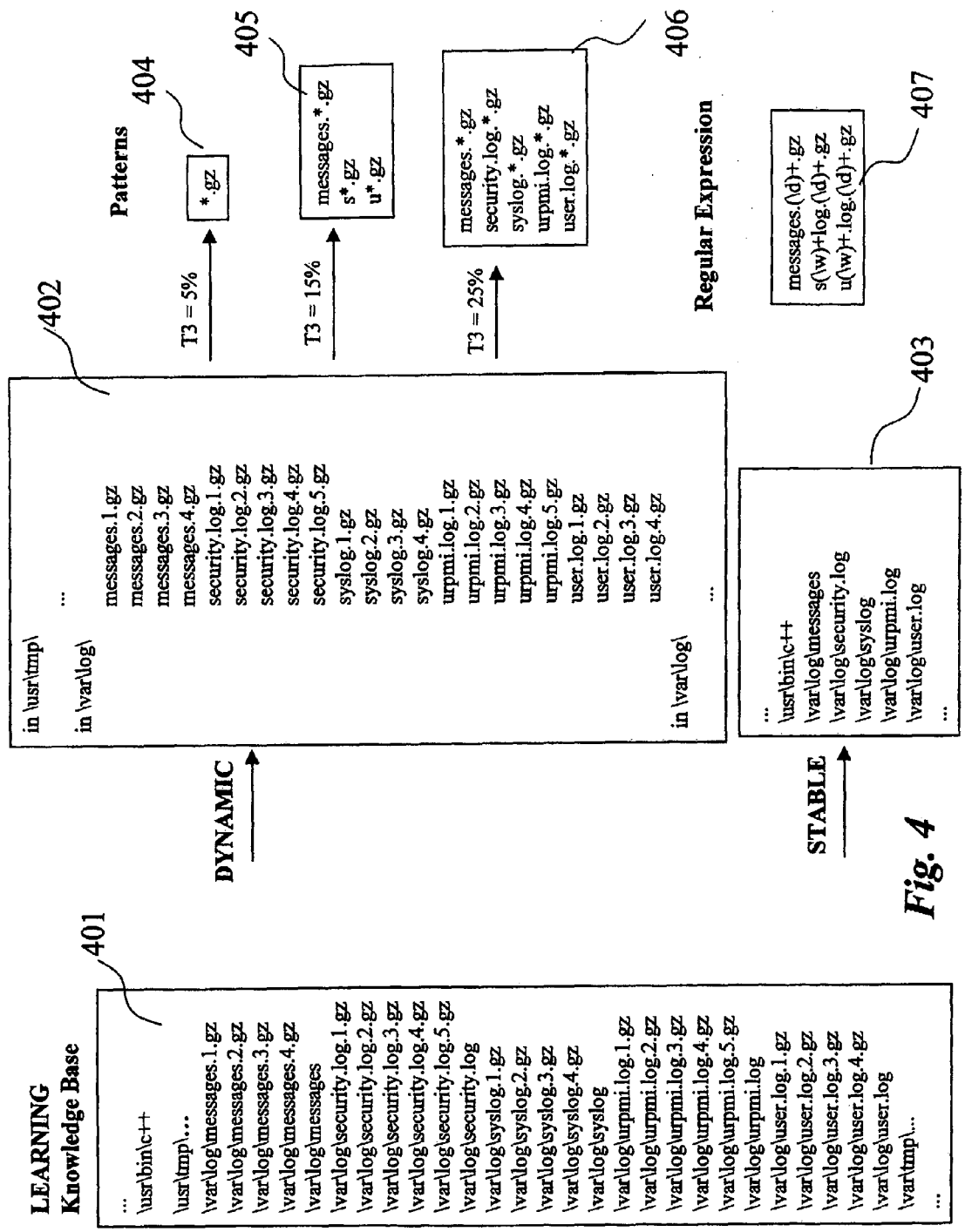
FIG. 4 shows an example of discover patterns.

Referring to the exemplary arrangement described herein, FIG. 4 shows how patterns may be derived from a list of complete pathnames designated 401. First of all the list is divided in subsets corresponding to the directory structure of the filesystem, designated 402. Then the method is applied only to filenames of the same directory. This is done in order to avoid discovering patterns such as "/*" (for UNIX-like operating systems) or "C:\*" (for Microsoft operating systems) that would cover the whole filesystem.

Another issue to be considered is the use of thresholds in order to extract a "good" set of patterns.

While an in-depth description of what can be considered a "good" set can be found in prior art documents such as the two last cited in the foregoing, the arrangement described herein tries to avoid, insofar as possible, discovering patterns such as "*" that covers the whole set, or to find as many patterns as the cardinality of the set itself (which is of course useless). By defining a percentage threshold T3 the solution tries to obtain a set of longest possible patterns but with a maximum cardinality of T3 percent of the cardinality of the set of strings to be covered.

FIG. 4 shows an example where the directory /var/log of a Linux Systems is considered. This directory contains some files (i.e. messages, security.log, syslog, urpmi.log, user.log) that can be considered stable, and designated 403, since they are log files that are regularly incremented with log entries by several applications. However, when they grow too much, a rotation method stores them in compressed files in the same directory (i.e. messages.1.gz, messages.2.gz, security.log.1.gz, etc.). These compressed files can be considered dynamic, and designated 402, since they are opened/written/closed only once. In the solution described herein, a standard Anomaly Detection System would report anomalies every time such compression will take place, since the name of the compressed file will always be new (with an incrementing number in the name). On the contrary, with the proposed Pattern Discovery method all these future files are covered.

FIG. 4 also shows the importance of the correct settings of the threshold T3 since the resulting set of patterns, designated 404, 405, and 406 depends on its value; being in this case 25% the value that brings the best pattern set.

Figure 5:
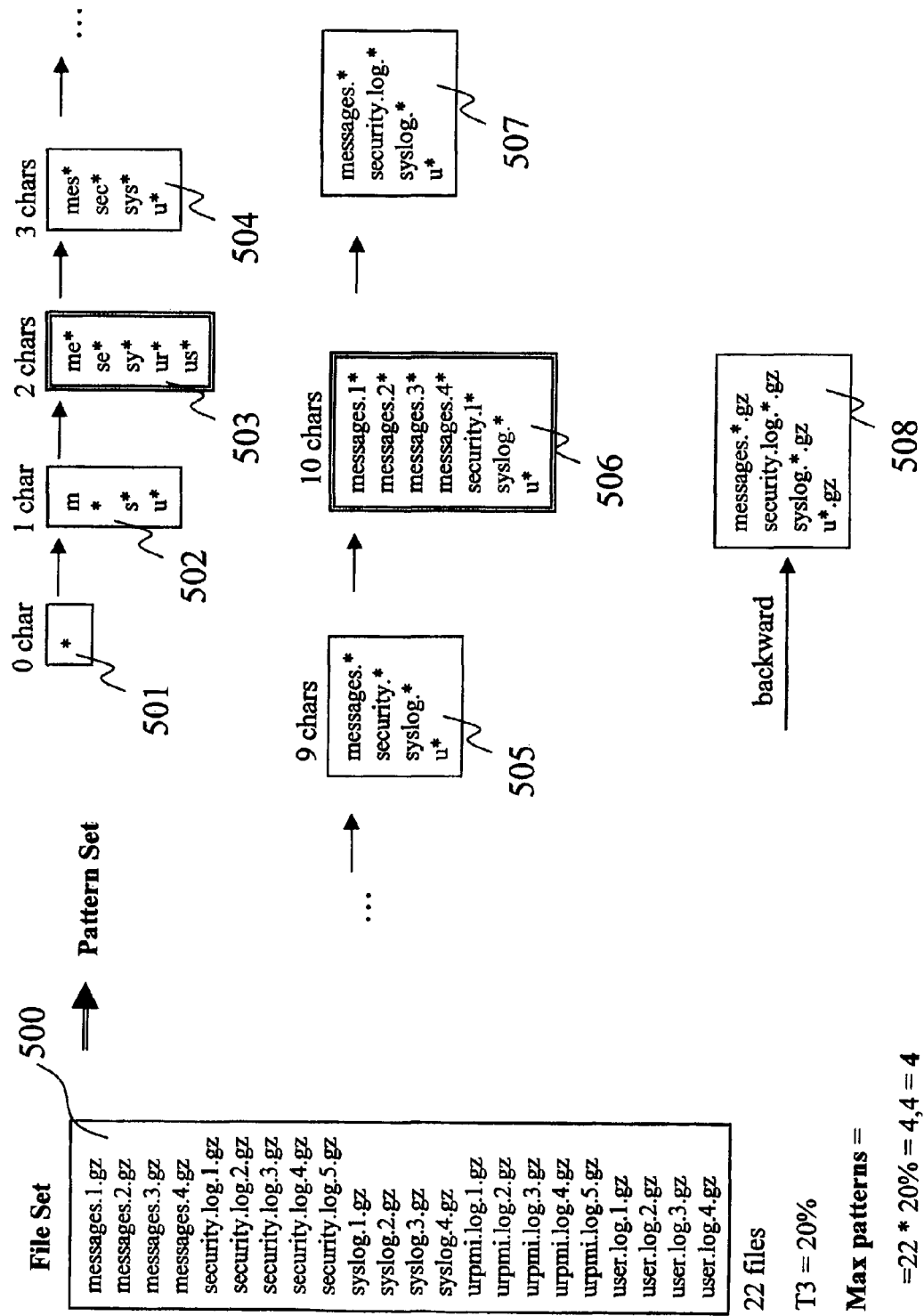
FIG. 5 shows an example of a refining process within the framework of the exemplary arrangement described herein.

As schematically shown in FIG. 5, the method of Pattern Discovery can be described with these steps:

1—set a threshold (e.g. T3=20%) and calculate from the File Set 500 the maximum number of patterns, which is equal to 4 in the example shown;

2—start with the pattern set 501 with only one pattern of zero characters (only the jolly "*");

3—use one more character and check how many patterns are needed to cover the whole set (step 502);

4—if they are less than the fixed threshold the pattern set is updated and the previous step 3 is repeated, else stop.

The blocks designated 503 to 507 are exemplary of the possible repetition of these steps with increased numbers of characters in the pattern set.

The transition from the step 503 to the step 504 is exemplary of the possibility that the elements in the set are in excess of the maximum number of patterns (4 in this case) whereby e.g. the character "u*" cannot refined.

It is then possible to refine patterns by applying the same method on each pattern backward from the end of filenames. FIG. 5 shows an example of this refining process.

The method can be applied to sockets recorded as strings in the form of "<protocol>:<port>:<local address>:<remote address>". Several server applications are running on the system monitored; many of the sockets used by each server will be considered dynamic since the remote address will be very often different and using the resource only for a short period of time (assuming to receive many client connections from many different hosts, as it can be the case of a web server or a public ftp server).

As a first step, the dynamic socket set will be divided into sub-sets according to the "<protocol>:<port>"; i.e. for a web server "HTTP:80", or "FTP:21" for an ftp server, and so on. Then from each sub-set it will be possible to try to discover patterns in the remote address part of the socket name (the local address should always be the one of the monitored host). The method will therefore extract patterns such as "HTTP:80:localhost:*" in case of a public web server, but it could also find more specific patterns such as "HTTP:80:localhost:10.10.*" if the web server is used for a company intranet and it is hence accessed only from a class of IP addresses.

After this process is executed on all the monitored resources, the knowledge base used in the analysis phase, designated 107 in FIG. 1, will be the stable knowledge base plus the dynamic knowledge base with patterns. So globally the knowledge base is more compact (the temporary file list is reduced by a factor T3) but it is more rich in semantic since it has discovered that the normal behavior of the system is not only the one recorded in learning phase, but it can be extended to a random behavior in the dynamic parts of the system. Hence, normal behavior is equal to the stable part (exact match with recorded values) plus the dynamic part (patterns that describe dynamic zones of the system).

The whole stable part is maintained even if some resource can result to be covered by patterns because for each stable resource are maintained also other properties (such as size, owner, permissions, etc.) that can be used in analysis to reveal anomalies; while resources covered by patterns are considered to be dynamic and hence no further detection is applied on them.

Step (d)—The analysis phase of an Anomaly Detection system typically just matches the instant behavior of the system with the one recorded in learning phase. Doing so, every process, file or other resource used by the system which is not recorded in the knowledge base is considered to be an anomaly. But using a regular-expression like matching, instead of an exact match, the resource used can be covered by a pattern instead of being exactly present as it is. In fact "regular patterns" are very simple regular expressions, with only one jolly character.

Consequently, during the analysis phase, designated 108 in FIG. 1, every resource used by the system is first searched in the stable part of the knowledge base and, if it is found, an in-depth analysis can be performed by checking other monitored properties of the resource (size, owner, permissions, etc.). On the other hand, if the resource is not found in the stable part of the knowledge base, instead of issuing an alert, it can be searched with a regular-expression like match in the set of patterns created in Step (c). If it is covered by a pattern it can be assumed that is a temporary resource, or a minor anomaly that in any case must not be signaled because it would represent a False-Positive alarm. Of course if neither the patters cover the resource, an alert should be emitted.

Quite obviously, the exemplary embodiment just described is only a first possible implementation of the solution described herein. Some major or minor change and improvement can be made in future alternative embodiments.

Specifically, all the resources (i.e. also processes, devices, registry, etc., and not only files or sockets) used by the system under surveillance can be monitored in the way described herein.

Figure 6:
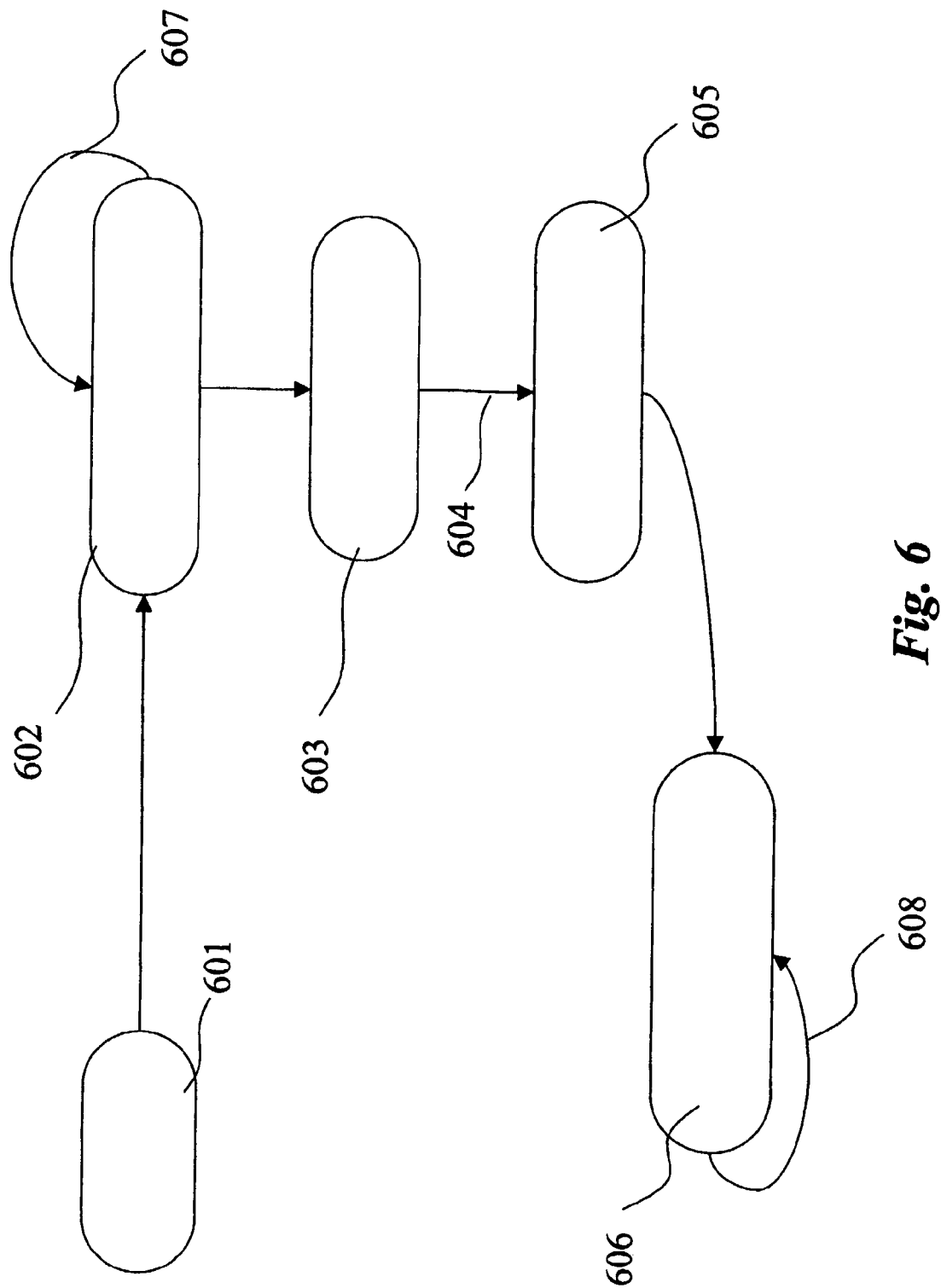
FIG. 6 is a schematic state diagram of an Intrusion Detection System as described herein.

FIG. 6 is a schematic state diagram of an Intrusion Detection System configured for operating along the lines described in detail in the foregoing.

From an initial state, designated 601 in FIG. 6, where the IDS is not active, the learning stage is started. In the learning state, designated 602 in FIG. 6, the IDS records 607 all events occurring in the system and creates its Knowledge Bases (KBs). When the learning process is stopped, the IDS is in a wait state, designated 603 in FIG. 6, ready to optimize its KBs. The optimization process, designated 604 in FIG. 6, is what this disclosure is all about. With the optimized KBs, the IDS is in another wait state, designated 605 in FIG. 6, ready to be used in analyze mode. In analyze state, designated 606 in FIG. 6, the IDS performs the job 608, for which it was actually designed: it monitors all the events occurring in the system and it emits alarms in case of malicious behaviour.

Further possible developments of the basic arrangement described in detail in the foregoing include, i.a.:
  improved pattern syntax, evolving from regular patterns to regular expressions, which are much richer in semantic and flexibility, as also shown in FIG. 4 with reference number 407;
  adopting the same approach as previously described for resources not recorded as strings or, more generally, as sequences from which some patterns can be easily discovered. This is the case of binary data such as network packet payloads, or whole binary files (as for example is made for integrity check and data recovery).

Consequently, without prejudice to the underlying principles of the invention, the details and the embodiments may vary, also appreciably, with reference to what has been described by way of example only, without departing from the scope of the invention as defined by the annexed claims.

The invention claimed is:

1. A computer implemented method of detecting intrusions in a system under surveillance, wherein said intrusions are detected, using a computer, by analyzing events occurring during operation of said system under surveillance by matching said events against a knowledge base comprising information on events which occurred during a learning phase, the method comprising:
  recording, using a computer, during said learning phase, temporal data that includes a timestamp corresponding to when a specific system resource was used relating to said events which occurred during said learning phase, said learning phase occurring at a different time from an analysis phase;
  identifying, using a computer, a dynamic part of said knowledge base as a function of said temporal data, wherein said dynamic part includes a list of system resources whose temporal data indicate that use of said system resources is below a predetermined threshold level of use during said learning phase;
  discovering, using a computer, patterns that cover said dynamic part of the knowledge base; and
  performing, using a computer, during said analysis phase, a regular expression match at least with respect to said dynamic part of the knowledge base.

2. The method of claim 1, wherein said step of analyzing comprises matching against said knowledge base, information related to at least one of the entities selected from: the processes running on said system under surveillance, the credentials under which these processes are run and the system resources these processes use.

3. The method of claim 1, wherein said step of recording comprises recording during said learning phase, temporal data selected from: when a process run on said system under surveillance starts and/or ends, when said process requests and/or releases a certain resource, and how many times the resource is used during said learning phase.

4. The method of claim 3, wherein said step of recording comprises tracking with a timestamp during said learning phase each instant when any resource used by said system under surveillance is requested or released.

5. The method of claim 3, comprising the steps of:
  recording, using a computer, during said learning phase, what files are opened and/or closed by what processes on said system under surveillance; and storing, using a computer, in said knowledge base, along with said temporal data, at least one of the associated file names, the file size, the file owner and the file permissions.

6. The method of claim 1, wherein said step of recording comprises recording during said learning phase temporal data related to said system under surveillance selected from:
- a first timestamp indicating when a given file was opened for the first time;
- a second timestamp indicating when said given file was closed for the last time;
- an integer indicating how many times said given file was opened and/or closed between the instants identified by said first and second timestamps; and
- an integer indicating the amount of time a given file was in the open state.

7. The method of claim 1, wherein said step of recording comprises recording during said learning phase two global timestamps indicating the beginning and the end of said learning phase.

8. The method of claim 1, wherein said step of recording comprises recording during said learning phase temporal data related to said system under surveillance selected from:
- instants when sockets are created and/or destroyed;
- a timestamp when the first instance of a given process run on said system under surveillance starts; and
- a further timestamp when the last instance of said given process exits.

9. The method of claim 1, comprising the step of identifying, using a computer, within said knowledge base, a stable part comprising a list of resources of said system under surveillance for which said temporal data indicate a level of use during said learning phase above at least one respective threshold of use.

10. The method of claim 1, comprising the steps of:
- defining, using a computer, a first threshold that indicates what is considered to be a rare event in comparison with a whole duration of said learning phase, and a second threshold that indicates a minimum number of occurrences of an event over said learning phase; and
- identifying, using a computer, said dynamic part of said knowledge base as a function of said first and second thresholds.

11. The method of claim 1, wherein said step of discovering comprises extracting from said dynamic part of the knowledge base, a set of patterns identifying in said dynamic part of the knowledge base, areas that can be considered dynamic instead of simple data lists.

12. The method of claim 11, wherein, for resources of said system under surveillance recorded as strings, said step of discovering comprises finding at least one regular pattern that covers the whole dynamic set.

13. The method of claim 12, comprising the step of selecting, using a computer, said regular patterns as patterns having only one variable symbol that can appear only once.

14. The method of claim 12, comprising the step of selecting, using a computer, said regular patterns as follows:
- if the strings are composed of characters from the alphabet, regular patterns are non-empty strings from the same alphabet that also contain one special character called jolly; and
- considering a pattern as a pattern covering a set of strings if all strings in the set can be obtained from the pattern by substituting the jolly with an appropriate sequence of characters.

15. The method of claim 11, comprising the steps of:
- identifying, using a computer, within said knowledge base, a stable part comprising a list of resources of said system under surveillance for which said temporal data indicate a level of use during said learning phase above at least one respective threshold of use; and
- extracting, using a computer, from said dynamic part of the knowledge base a set of significant patterns that should identify dynamic areas of the knowledge base without covering said stable part.

16. The method of claim 15, comprising the step of applying, using a computer, a pattern discovery process to at least one set of dynamic data based on the semantic thereof.

17. The method of claim 16, comprising the step of dividing, using a computer, said set of dynamic data into sub-sets by means of tuned thresholds.

18. The method of claim 16, comprising the step of applying, using a computer, a pattern discovery process based on at least one of: file system structure or directories for files, the protocol:port groups for sockets, and the domains for users.

19. The method of claim 14, comprising the step of applying a pattern discovery process, using a computer, to at least one set of dynamic data based on the semantics thereof, wherein said pattern discovery process comprises the steps of:
a) setting a given threshold and calculating a maximum number of patterns;
b) initializing the pattern set with a single pattern of zero characters, which means to have only the jolly;
c) using one more character;
d) checking how many patterns are needed to cover the whole set; and
e) if these patterns are less than said fixed threshold, updating the pattern set and going back to step c), else stop.

20. The method of claim 19, comprising the step of refining said patterns, using a computer, by applying the same method on each pattern backward from the end of file names.

21. The method of claim 16, comprising the step of applying said pattern discovery process, using a computer, to sockets recorded as strings in the form of "<protocol>:<port>:<local address>:<remote address>" by:
- dividing the dynamic socket set into sub-sets according to the "<protocol>:<port>" semantics; and
- subjecting each sub-set to a discovery process to discover patterns in the remote address part of the socket name.

22. The method of claim 1, wherein said analysis phase comprises the step of performing, using a computer, a regular-expression matching, whereby said matching against said knowledge base is performed on the basis of pattern matching instead of exact matching.

23. The method of claim 22, comprising the steps of:
- identifying, using a computer, within said knowledge base, a stable part comprising a list of resources of said system under surveillance for which said temporal data indicate a level of use during said learning phase over at least one respective threshold of use; and
- during said analysis phase, searching, using a computer, for any resource used by said system under surveillance in said stable part of said knowledge base, and
  i) if said resource is found in said stable part, performing an in-depth analysis by checking other monitored properties of the resource, and
  ii) if said resource is not found in said stable part, searching said resource with a regular-expression like match in said dynamic part and emitting an alert if said resource is not found to be covered by any of said patterns in said dynamic part of said knowledge base.

24. An intrusion detection computer system for detecting intrusions in a host computer system under surveillance, wherein said intrusion detection computer system comprises at least one computer and is configured to analyze events occurring during operation of said host computer system under surveillance by matching said events occurring during operation of said host computer system against a knowledge base comprising information on events which occurred during a learning phase, the intrusion detection computer system being configured for performing the method of claim 1.

25. A network comprising at least one system exposed to intrusions, said network being under surveillance by an intrusion detection computer system according to claim 24.

26. A non-transitory computer readable medium encoded with a computer program product, loadable into a memory of at least one computer and comprising software code portions for performing the method of claim 1.

* * * * *